United States Patent
Sheba

(10) Patent No.: US 6,301,311 B1
(45) Date of Patent: Oct. 9, 2001

(54) NON-COHERENT, NON-DATA-AIDED PSEUDO-NOISE SYNCHRONIZATION AND CARRIER SYNCHRONIZATION FOR QPSK OR OQPSK MODULATED CDMA SYSTEM

(75) Inventor: Mahbuba Sheba, Garland, TX (US)

(73) Assignee: Anritsu Company, Morgan Hill, CA (US)

( * ) Notice: Subject to any disclaimer, the term of this patent is extended or adjusted under 35 U.S.C. 154(b) by 0 days.

(21) Appl. No.: 09/247,425

(22) Filed: Feb. 10, 1999

(51) Int. Cl.$^7$ .............................. H04L 7/027; H04L 7/033
(52) U.S. Cl. ............................................. 375/326; 375/367
(58) Field of Search ............................ 375/367, 149, 375/326, 147, 355

(56) References Cited

U.S. PATENT DOCUMENTS

| 5,579,338 | 11/1996 | Kojima | 375/208 |
| 5,691,974 | * 11/1997 | Zehavi et al. | 370/203 |
| 5,717,713 | * 2/1998 | Natali | 375/200 |
| 5,764,630 | * 6/1998 | Natali et al. | 370/320 |

FOREIGN PATENT DOCUMENTS

| 0 892 528 A2 | 1/1999 | (EP) . |
| 210 739 A | 6/1989 | (GB) . |

| W99/31817 | 6/1999 | (WO) . |

OTHER PUBLICATIONS

Viterbi, A. *CDMA Principles of Spread Spectrum Communication*. Section 3.2.3., pp. 45–47 (Jun. 1995).

* cited by examiner

Primary Examiner—Chi Pham
Assistant Examiner—Dung X. Nguyen
(74) Attorney, Agent, or Firm—Fliesler Dubb Meyer & Lovejoy LLP

(57) ABSTRACT

A non-coherent method for (PN) code synchronization and eliminates the need for prior clock synchronization between a transmitter and receiver. The method further eliminates any need for prior knowledge of a transmitted data sequence to provide synchronization. In the method, based on a coarse estimation of the carrier frequency, a received CDMA intermediate frequency (IF) signal is baseband converted to in-phase (I) and quadrature-phase (Q) components. The baseband I and Q components are then used to calculate an estimated delay $\tau$ at a PN synchronization roll-over point. The estimated delay $\hat{\tau}$ is used in an intermediate data sequence in the synchronization roll-over calculation process to more accurately estimate carrier frequency error and phase offset for the IF carrier signal used in the baseband conversion process. The estimated carrier signal is then provided as feed back to correct for the coarse estimate of the carrier frequency error and phase offset, thus adaptively correcting for Doppler shift in a received signal.

7 Claims, 2 Drawing Sheets

NON-COHERENT, NON-DATA-AIDED PSEUDO-NOISE SYNCHRONIZATION AND CARRIER SYNCHRONIZATION FOR QPSK OR OQPSK MODULATED CDMA SYSTEM

BACKGROUND OF THE INVENTION

1. Field of the Invention

The present invention relates to a method for performing delay. estimation and carrier synchronization on quadrature phase shift keying (QPSK) or offset QPSK (OQPSK) modulated code division multiple access (CDMA) systems. More particularly, the present invention provides a method for acquisition of a pseudo-noise (PN) synchronization point as well as Doppler shift in a received carrier signal.

2. Description of the Related Art

The motion of a receiver relative to a transmitter, such as a cell phone relative to a cell site, can generate a Doppler frequency and phase shift in a carrier signal. Such a frequency or phase shift can cause an increase in the bit error rate for synchronized users.

CDMA technology focuses on artificially increasing the bandwidth of a signal as a method of spread spectrum. Bandwidth is increased by breaking each bit into a number of sub-bits called "chips". Assuming each bit is broken into 10 chips, the result is an increase in data rate by 10. By increasing the data rate by 10, bandwidth is also increased by 10.

Each original CDMA bit is divided into chips by multiplying the bit by a pseudo-noise (PN) code. A PN-code is an arbitrary sequence typically ranging between –1 and 1. Multiplying each of the original modulated signal bits by the PN-code results in the original bits being dividing into smaller chips, hence, increasing bandwidth. The greater number of chips which the PN-code creates results in a wider bandwidth proportional to the number of chips.

To create a transmitted signal with PN-coding, a transmitter first modulates a message at a higher carrier frequency. For spread spectrum, all messages are modulated on the same carrier. After modulation, each signal is then multiplied by a PN-code in the transmitter to spread the bandwidth. Multiplying by the PN-code to spread signal bandwidth can also be done before carrier modulation.

In the receiver, the incoming signal is the spread spectrum signal. In order for the receiver to extract a transmitted message, the incoming signal is multiplied by the same PN-code used in the transmitter. With the PN-code ranging between –1 and 1, multiplying by the same PN-code in the receiver effectively cancels out the PN-code on the particular message.

With a Doppler shift due to the receiver moving relative to the transmitter, cancellation of the Doppler shift must occur to establish synchronization. Synchronization can be divided into two steps: acquisition and tracking. Acquisition is the process of roughly aligning the PN-code of the transmitted signal with the identical PN-code of the received signal. Tracking occurs after acquisition, and maintains a tight alignment of the two PN-codes over time. Misalignment of the transmit and receive PN-codes results in noise being generated in the received signal. The more severe the misalignment, the greater the bit error rate can be for the received signal.

The acquisition process for synchronization in the past required prior clock synchronization, including both frequency and phase synchronization, between the transmitter and receiver, or a prior knowledge of the transmitted data sequence.

SUMMARY OF THE INVENTION

In accordance with the present invention a non-coherent method for pseudo-noise (PN) code synchronization is provided eliminating the need for clock synchronization between a transmitter and receiver, and further eliminating a need for prior knowledge of the transmitted data sequence. The method further performs carrier synchronization simultaneously with PN synchronization.

In the method, based on a coarse estimation of carrier frequency error and phase offset, the received CDMA intermediate frequency (IF) signal is baseband converted to in-phase (I) and quadrature-phase (Q) components. The baseband I and Q components are then used to calculate an estimated delay at a PN synchronization roll-over point for the carrier signal. Once the PN synchronization roll-over point is determined, the delay calculated is used in an intermediate data sequence in the synchronization roll-over calculation process to more accurately estimate carrier frequency and phase delay for the carrier signal. The estimated carrier signal is then provided as feed back to correct for the coarse estimate of the carrier frequency error and phase offset, thus adaptively correcting for Doppler shift in the received signal.

BRIEF DESCRIPTION OF THE DRAWINGS

Further details of the present invention are explained with the help of the attached drawings in which.

DETAILED DESCRIPTION

I. Overview

Figure 1:
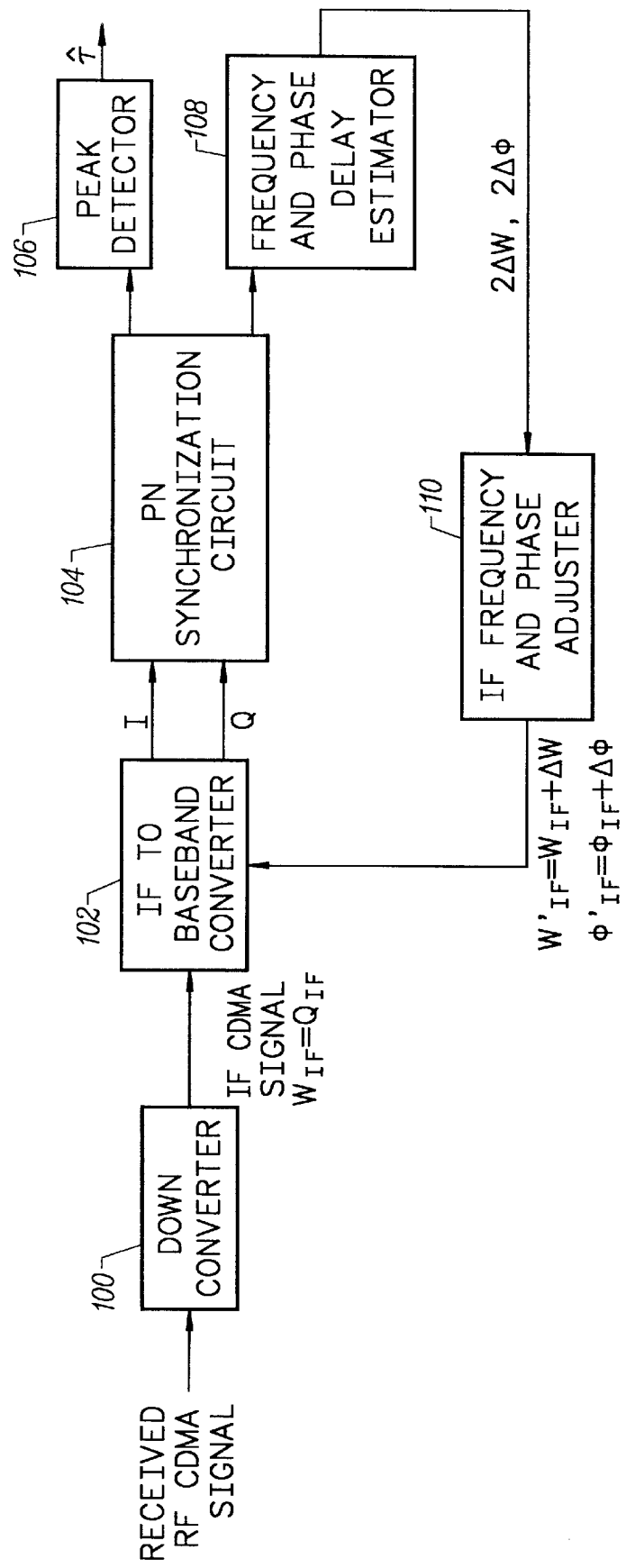
FIG. 1 shows a high level block diagram for components used to provide carrier synchronization according to the present invention.

FIG. 1 shows a high level block diagram for components used to provide carrier synchronization in accordance with the present invention. As shown, a CDMA RF signal is received and down converted to an intermediate frequency (IF) signal with a frequency $\omega_{IF}$ and phase $\phi_{IF}$ in downconverter 100. The IF signal is then baseband converted to provide I and Q components with a coarse estimation of the carrier frequency error and phase offset in baseband (BB) converter 102. The I and Q components from the baseband converter 102 are then used in the PN synchronization circuit 104 to determine delay estimates using formulas according to the present invention.

Signals from the PN synchronization circuit 104 are provided to peak detector 106, and the output of the peak detector 106 provides an estimate of the delay in the received signal $\hat{\tau}$ at the PN spreading sequence roll-over point. Smaller search windows can then be used in the calculations made by the PN synchronizer circuit 104 with results provided to the peak detector 106 until an estimate of the delay $\hat{\tau}$ is obtained at the PN spreading sequence roll-over point with a desired resolution.

Once a desired PN synchronization is obtained from the output of the peak detector 106, the delay $\hat{\tau}$ calculated at the roll-over point is used in the PN synchronizer circuit 104 and an intermediate data sequence from the PN synchronizer circuit 104 is provided to the frequency and phase delay estimator 108. The frequency and phase estimator 108 then provides a more accurate estimate for frequency and phase delay ($2\Delta\omega, 2\Delta\phi$) for the carrier signal. The frequency and phase delay from estimator 108 is provided to an IF frequency and phase adjuster 110 which generates a feed back signal with a frequency $\omega'_{IF}=\omega_{IF}+\Delta\omega$ and phase $\phi'_{IF}=\phi_{IF}+\Delta\phi$ to the baseband converter 102 to provide a better coarse estimate of the carrier frequency error and phase offset for baseband conversion. After several iterations, the circuit of FIG. 1 can provide a very accurate indication of the carrier delay, thus adaptively correcting for Doppler shift in the received signal.

II. Delay Estimation

The baseband converted signal from baseband converter 102, as provided to the PN synchronization circuit 104, can be mathematically modeled in the following way:

$$R_{rcv}(t) = R(t)e^{i(\Delta\omega t+\Delta\phi)} \quad (1)$$

$$= I(t) + iQ(t) \quad (2)$$

where, $R(t)$ is the received baseband signal with perfect carrier synchronization, and $\Delta\omega$ and $\Delta\phi$ are the coarse carrier frequency error and phase offset for the baseband I and Q signal. The baseband converted in-phase and quadrature-phase component signals are represented by $I(t)$ and $Q(t)$ respectively.

In the PN synchronization circuit 104, the in-phase and quadrature-phase components ($I(t)$ and $Q(t)$) and the $\pi/4$ phase shifted in-phase and quadrature-phase components ($I'(t)$ and $Q'(t)$) are used in a formula to determine delay with respect to a short PN spreading sequence roll-over point. For the formula, $I'(t)$ and $Q'(t)$ can be represented as follows:

$$R'_{rcv}(t) = R_{rcv}(t)e^{i(\pi/4)} \quad (3)$$

$$= I'(t) + iQ'(t) \quad (4)$$

$$= 1/\sqrt{2}\,[(I(t)-Q(t))+i(I(t)+Q(t))] \quad (5)$$

An estimated delay, $\hat{\tau}$ with respect to the in-phase (I) and quadrature-phase (Q) short PN spreading sequence roll-over point can be expressed as:

$$\hat{\tau} = \max_{\tau\in[\tau_b,\tau_e]} \left[\left(\sum_{\eta=0}^{N-1} x(t+\tau)\right)^2 + \left(\sum_{\eta=0}^{N-1} x'(t+\tau)\right)^2\right] \quad (6)$$

where, $$x(t+\tau) = I(t+\tau)Q(t+\tau)I_{PN}(t)Q_{PN}(t) \quad (7)$$

$$x'(t+\tau) = I'(t+\tau)Q'(t+\tau)I_{PN}(t)Q_{PN}(t) \quad (8)$$

$$= 1/2(I^2(t)-Q^2(t))I_{PN}(t)Q_{PN}(t) \quad (9)$$

t is $\eta T_c$, where $\eta=0,1,2,\ldots N-1$ indicating the signals $X(t+\tau)$ and $x'(t+\tau)$ are sampled at a rate of $1/T_e$ in equation (6)

Figure 2:
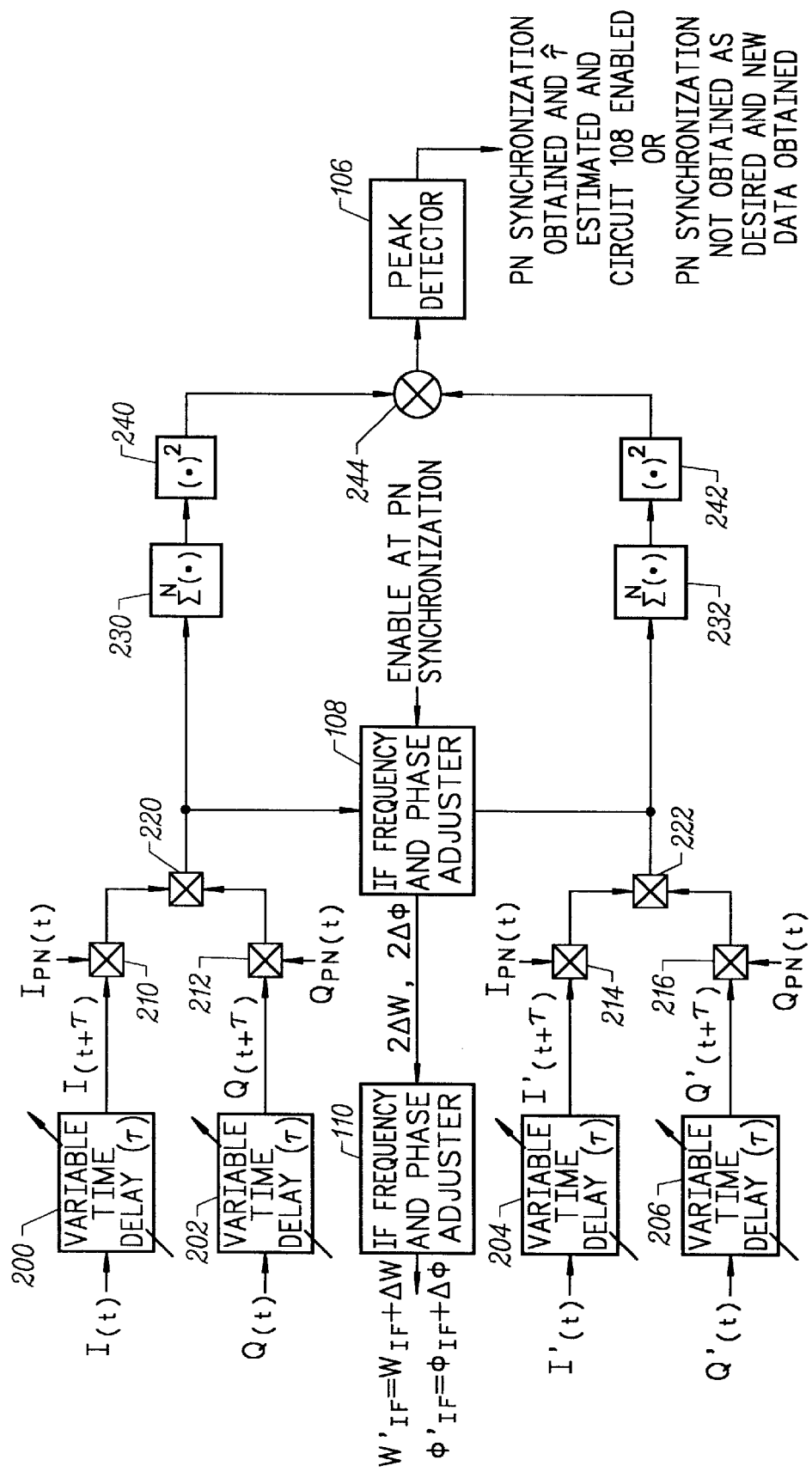
FIG. 2 shows a detailed block diagram for the PN synchronization circuit of FIG. 1.

$T_c$ is a duration of a PN chip $\tau b$ is the beginning of a search window for delay estimation $\tau_e$ is the end of a search window for delay estimation N is the total number of samples used in the estimation process $I_{PN}(t)$ is the in-phase short PN spreading sequence $Q_{PN}(t)$ is the quadrature-phase short PN spreading sequence FIG. 2 shows a detailed block diagram for the PN synchronization circuit 104 of FIG. 1 with components used to determine $x(t+\tau)$ and $x'(t+\tau)$ according to equations (7) and (8). FIG. 2 also shows connection of components of the PN synchronization circuit 104 to the peak detector 106 to enable determination of $\hat{\tau}$ of equation (6). FIG. 2 further shows connection of the PN synchronization circuit 104 to the frequency and phase estimator 108 and frequency and phase adjuster 110.

As shown in FIG. 2, I(t) is received by a variable delay circuit 200. The variable delay circuit 200 can be controlled to provide a desired delay $\tau$ enabling the output of the delay circuit 200 to provide the component $I(t+\tau)$ for equation (7) which can be used in equation (6). Q(t) is received by a variable delay circuit 202. The variable delay circuit 202 is controlled to provide a desired delay T enabling the output of the delay circuit 202 to provide the component $Q(t+\tau)$ for equation (7) which can be used in equation (6).

The signals $I'(t)$ and $Q'(t)$ can be provided to the PN synchronization circuit 104 from baseband converter 102. With $I'(t)$ and $Q'(t)$ provided, delay circuits 204 and 206 can be included in the PN synchronization circuit, as shown in FIG. 2. As with the delay circuits 200 and 202, the delay circuits 204 and 206 can be controlled to provide a desired delay $\tau$ so that the output of circuits 204 and 206 provide the components $I'(t+\tau)$ and $Q'(t+\tau)$ of equation (8) which can be used in equation (6).

Without components to provide the signals $I'(t)$ and $Q'(t)$, the PN synchronization circuit 104 might include circuitry to square the signals $I(t)$ and $Q(t)$, subtract the difference, and multiply the result by ½ to provide the component ½($I^2(t)-Q^2(t)$) of equation (9) to solve for $x'(t+\tau)$ instead of solving for $x'(t+\tau)$ using equation (8).

The PN spreading sequences are known parameters, so the terms $I_{PN}(t)$ and $Q_{PN}(t)$ in any of equations (7), (8) and (9) can be pre-calculated. In the circuit of FIG. 2 to provide the result for the component $x(t+\tau)$ of equation (7), the value $I_{PN}(t)$ is multiplied with $I(t+\tau)$ in multiplier 210. The value $Q_{PN}(t)$ is further multiplied with $Q(t+\tau)$ in multiplier 212. Multiplier 220 then combines the outputs of multipliers 210 and 212 to complete the function $I(t+\tau)I_{PN}(t)Q(t+\tau)Q_{PN}(t)$ of equation (7).

To provide the result for the component $X'(t+\tau)$ of equation (8) in the circuit of FIG. 2, the value $I_{PN}(t)$ is multiplied with the output of circuit 204 in multiplier 214. The value $Q_{PN}(t)$ is further multiplied with the output of circuit 206 in multiplier 216. Multiplier 222 then combines the outputs of multipliers 214 and 216 to complete the function $I'(t+\tau)I_{PN}(t)Q'(t+\tau)Q_{PN}(t)$ of equation (8).

The output of multiplier 220 is provided to a summer 230 which sums the results from the output of multiplier 220 N times. The output of the summer 240 is provided to squaring circuit 240. The output of the squaring circuit 240, thus, provides the component $$\left(\sum_{\eta=0}^{N-1} x(t+\tau)\right)^2$$

from equation (6). Similarly, the output of multiplier 222 is provided to summer 232 which sums the results from the output of multiplier 222 N times. The output of summer 232 is provided to squaring circuit 242, so that the output of squaring circuit 242 provides the component $$\left(\sum_{\eta=0}^{N-1} x'(t+\tau)\right)^2$$

of equation (6). The outputs of the summers 240 and 242 are provided to an adder 244, and the output of the adder is provided to a peak detector 106. The output of the peak detector 106 then provides the result for $\hat{\tau}$ of equation (6).

As can be seen from the components of the PN synchronization circuit of FIG. 2, although the components $I_{PN}(t)$ and $Q_{PN}(t)$ needed to solve equation (6) are known, the components I(t) and Q(t) must be interpolated in real time to determine the delay $\hat{\tau}$.

For an initial interpolation of a value for $\hat{\tau}$ a wide search window between $\tau_b$ and $\tau_e$ can be used with a low resolution to estimate the delay. Once an estimate of the delay $\hat{\tau}$ with the initial search window is obtained, a much smaller search window can be applied in consecutive data frames. With a communication system having a slow time varying process, a smaller search window can be used while tracking of the acquired carrier is maintained. Once the desired PN synchronization rollover point is obtained with a desired search window and resolution, the frequency and phase estimator 108 is activated to determine carrier frequency error and phase offset.

III. Limit of Coarse Carrier Frequency Error

A large coarse carrier frequency error can have a detrimental effect on the PN synchronization delay estimation process. The formula of equation (6) can be used if the following condition is met:

$$\Delta f_t \leq f_s \cdot 1/16 \cdot 1/N \qquad (10)$$

where $\Delta f_t$ is the carrier frequency error in the baseband signal and $f_s$ is the sampling rate of the broadband I and Q signals. Typically the carrier frequency error can be initially estimated with an accuracy which enables the condition of equation (10) to be met using a phase locked loop (PLL) in the baseband converter. In CDMA systems a reasonable choice of N for equation (6) can be 64 samples. If the sampling rate of the baseband I and Q signal is 4×1.2288 MHz, then the maximum frequency error tolerated for equation (6) is ±(1/16·1/64·4·1.2288 MHz) or ±4.8 kHz. If the frequency error $\Delta f_t$ of the carrier signal is outside the range of equation (10), but falls within a higher frequency tolerance the formula of equation (6) can be replaced with the following equation:

$$\hat{\tau} = \max_{\tau \in [\tau_b, \tau_e]} \left[ \sum_{\eta=0}^{N-1} (x_{LP}(t+\tau))^2 + \sum_{\eta=0}^{N-1} (x'_{LP}(t+\tau))^2 \right] \qquad (11)$$

where, $X_{LP}(t+\tau)$ is the output of the signal X(t+τ) to a low pass filter with a cutoff frequency at twice the frequency tolerance, and $X_{LP}'(t+\tau)$ is the output of the signal X'(t+τ) to a low pass filter with a cutoff frequency at twice the frequency tolerance.

The remaining parameters of equation (11) are identified previously with respect to equation (6). To provide a value for T using equation (11), the circuitry of FIG. 2 can be modified by replacing the summer 230 and squaring circuit 240 with a low pass filter with a cutoff frequency at twice the frequency tolerance $\Delta f_t$ followed by a total energy measuring element. The summer 232 and 242 are likewise replaced by a low pass filter and total energy measuring element. Existing algorithms for PN synchronization have similar limitations on frequency error as can be seen in Andrew Viterbi, *CDMA Principles of Spread Spectrum Communication*, section 3.2.3, pp. 45–47, June 1995.

III. Carrier Synchronization

After the PN synchronization roll-over point is acquired within the error limits as described above, both carrier frequency error and phase offset can be estimated using the frequency and phase estimator 108. The estimator 108 receives the output from the mixers 220 and 222 of FIG. 2 with the delay $\hat{\tau}$ provided at the output of peak detector 106 set in the variable delay devices 200, 202, 204 and 206. The estimator 108 applies these received signals to the formulas described below to provide an estimate for the frequency error $\Delta f$ and phase offset $\Delta \phi$ in the carrier signal. To derive the formula used in the estimator 108, it can be shown that the signal:

$$s(t) = x(t+\hat{\tau}) + i \cdot x'(t+\hat{\tau}) \qquad (12)$$

can be modeled as a single complex sinusoid in additive noise. Moreover, the frequency and phase of the signal s(t) has twice the error of the coarse carrier frequency and phase. Therefore, the carrier signal can be synchronized very accurately using sinusoidal parameter estimators on the signal s(t). The maximum likelihood (ML) estimator for a single complex sinusoid in additive white Gaussian noise is the Periodogram method. Using the Periodogram method, carrier frequency error and phase offset can be estimated as follows:

$$2\Delta f = \max_{f \in [-\Delta f_t, \Delta f_t]} \left| \sum_{\eta=0}^{M-1} s(t) \exp(-i 2\pi f t) \right| \qquad (11)$$

$$2\Delta \phi = \arctan \left[ \frac{\sum_{\eta=0}^{M-1} s(t') \sin 2\pi (2\Delta f) t'}{\sum_{\eta=0}^{M-1} s(t') \cos 2\pi (2\Delta f) t'} \right] \qquad (12)$$

where, t is $\eta T_c$, where $\eta = 0, 1, 2, \ldots N-1$, $T_c$ is a duration of a PN chip, $\Delta f_t$ is the frequency tolerance of the algorithm described in equation (10)

M is the total number of samples used in the carrier synchronization process. Note for better estimation, M can be a number much higher than N.

The circuit 108 then provides the value $2\Delta f$ according to equation (13) times $2\Pi$, totaling $2\Delta \omega$, to the frequency adjuster 110. The circuit 108 further provides the value $2\Delta \phi$ from equation (14) to the frequency adjuster 110. The frequency adjuster 110 then provides a signal with a frequency $\omega'_{IF}$ equal to the frequency of the carrier $\omega_{IF}$ as corrected for the error $\Delta \omega$ as feedback to the broadband converter 102. The frequency adjuster 110 signal further is provided with a phase $\phi'_{IF}$ equal to the phase of the original carrier $\phi_{IF}$ as corrected for the phase offset $\Delta \phi$.

Since equation (14) estimates twice the phase rather than absolute phase, the estimated phase can have a 180° phase ambiguity. In other words, the absolute phase change will be either the estimated phase offset $\Delta \phi$ from equation (14), or the phase offset from equation (14) plus 180°.

In most CDMA systems at the beginning of a channel a known data sequence is sent so that the receiver can acquire carrier synchronization. For example in an IS-95 CDMA wireless system, either a pilot channel, a preamble in an access channel, or a preamble in a traffic channel is sent from a transmitter to a receiver to assure successful handoff. If the method of the present invention is used to continuously synchronize to an incoming data sequence after synchronization using such a known data sequence, a 180° phase ambiguity will not be present. If the method of the present invention is used to demodulate an intermediate data sequence which has not been synchronized using a known data sequence, the 180° phase ambiguity can result in an inversion in the demodulated data sequence which can still be resolved by a channel decoder, such as a cyclical redundance check (CRC), or orthogonal demodulation if present in the system.

Although the present invention has been described above with particularity, this was merely to teach one of ordinary skill in the art how to make and use the invention. Many additional modifications will fall within the scope of the invention, as that scope is defined by the claims which follow.

What is claimed is:

1. A method for synchronizing a received signal with a transmitted signal comprising the steps of:

(a) converting the received signal into in-phase (I) and quadrature phase (Q) components using an estimate of frequency error ($\Delta f$) and phase offset ($\Delta \phi$) between the received signal and the transmitted signal;

(b) determining a delay ($\hat{\tau}$) between the received signal and the transmitted signal with respect to a pseudo-noise (PN) spreading sequence applied to the transmitted and received signals using the I and Q components of the received signal;

(c) determining a value for the estimate of the frequency delay ($\Delta f$) and the phase offset ($\Delta \phi$) between the received signal and the transmitted signal using the delay ($\hat{\tau}$); and (d) feeding back the value for the estimate determined in step (c) to be used as the estimate for converting in step (a).

2. The method of claim 1, wherein the delay ($\hat{\tau}$) is determined using the following equation:

$$\hat{\tau} = \max_{\tau \in [\tau_b, \tau_e]} \left[ \left( \sum_{\eta=0}^{N-1} x(t+\tau) \right)^2 + \left( \sum_{\eta=0}^{N-1} x'(t+\tau) \right)^2 \right]$$

where:
x(t+τ)=I(t+τ)Q(t+τ)I$_{PN}$(t)Q$_{PN}$(t); and
x'(t+τ)=I'(t+τ)Q'(t+τ)I$_{PN}$(t)Q$_{PN}$(t), and
where,
t=ηT, where η=0,1,2, . . . N−1
T$_c$ is a duration of a PN chip,
τ$_b$ is a delay at a beginning of a search window for delay estimation,
τ$_e$ is a delay at an end of a search window for delay estimation,
N is an integer indicating a desired number of samples,
I$_{PN}$(t) is an in-phase short PN spreading sequence, and
Q$_{PN}$(t) is a quadrature-phase short PN spreading sequence.

3. The method of claim 2, wherein the frequency error ($\Delta f$) between the received signal and the transmitted signal from step (c) is determined according to the following equation:

$$\Delta f = 1/2 \max_{f \in [-\Delta f_t, \Delta f_t]} \left| \sum_{\eta'=0}^{M-1} s(t') \exp(-i 2\pi f t') \right|$$

where s(t')=x(t'+$\hat{\tau}$)+i·x'(t'+$\hat{\tau}$), t'=ηT$_c$, where η'=0,1,2, . . . M−1, $\Delta f_t$ is a frequency tolerance, and M is an integer indicating a desired number of samples.

4. The method of claim 3, wherein the phase offset ($\Delta \phi$) between the received signal and the transmitted signal from step (c) is determined according to the following equation:

$$\Delta \phi = 1/2 \arctan \left[ \frac{\sum_{\eta=0}^{M-1} s(t') \sin 2\pi (2\Delta f) t'}{\sum_{\eta=0}^{M-1} s(t') \cos 2\pi (2\Delta f) t'} \right].$$

5. The method of claim 2 wherein the frequency error $\Delta f$ between the received signal and the transmitted signal is within a frequency tolerance $\Delta f_t$ such that $\Delta f_t < \frac{1}{16} \cdot 1/N \cdot f_s$, where $f_s$ is a sampling rate of the I and Q components of the received signal.

6. The method of claim 1, wherein the delay ($\hat{\tau}$) is determined using the following equation:

$$\hat{\tau} = \max_{\tau \in [\tau_b, \tau_e]} \left[ \sum_{\eta=0}^{N-1} (x_{LP}(t+\tau))^2 + \sum_{\eta=0}^{N-1} (x'_{LP}(t+\tau))^2 \right]$$

where:

x(t+τ)=I(t+τ)Q(t+τ)I$_{PN}$(t)Q$_{PN}$(t), x'(t+τ)=I'(t+τ)Q'(t+τ)I$_{PN}$(t)Q$_{PN}$(t), t=ηT, where η=0,1,2, . . . N−1, T$_c$ is a duration of a PN chip, τ$_b$ is a delay at a beginning of a search window for delay estimation, τ$_e$ is a delay at an end of a search window for delay estimation, N is an integer indicating a desired number of samples, I$_{PN}$(t) is an in-phase short PN spreading sequence, and Q$_{PN}$(t) is a quadrature-phase short PN spreading sequence, $\Delta f_t$ is a frequency tolerance, $x_{LP}$(t+τ) is an output of a low pass filter provided with the signal x(t+τ) as an input, the low pass filter receiving the signal x(t+τ) having a cutoff frequency at approximately twice the frequency tolerance, and $x_{LP}$'(t+τ) is an output of a low pass filter provided with the signal x'(t+τ) as an input, the low pass filter receiving the signal x'(t+τ) having a cutoff frequency at approximately twice the frequency tolerance.

7. The method of claim 6 wherein the frequency error $\Delta f$ between the received signal and the transmitted signal is within the frequency tolerance $\Delta f_t$ such that $\Delta f_t \geq \frac{1}{16} \cdot 1/N \cdot f_s$, where $f_s$, is the sampling rate of the I and Q components of the received signal.

* * * * *